United States Patent
Mirzaei et al.

(10) Patent No.: US 9,577,685 B1
(45) Date of Patent: Feb. 21, 2017

(54) PRE-DISTORTION CALIBRATION

(71) Applicant: Broadcom Corporation, Irvine, CA (US)

(72) Inventors: Alex Ahmad Mirzaei, Irvine, CA (US); Hooman Darabi, Laguna Niguel, CA (US); Masoud Kahrizi, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 15/044,969

(22) Filed: Feb. 16, 2016

Related U.S. Application Data

(60) Provisional application No. 62/289,649, filed on Feb. 1, 2016.

(51) Int. Cl.
    *H04B 1/04* (2006.01)

(52) U.S. Cl.
    CPC ..... *H04B 1/0475* (2013.01); *H04B 2001/0425* (2013.01)

(58) Field of Classification Search
    CPC .... H04L 27/3405; H04L 27/367; H04B 15/00; H04B 17/00; H04B 3/46; H04B 1/0475; H04B 2001/0425
    See application file for complete search history.

(56) References Cited

U.S. PATENT DOCUMENTS

| | | | | |
|---|---|---|---|---|
| 6,731,693 | B1 * | 5/2004 | Damgaard | H04L 27/206 331/127 |
| 2013/0336422 | A1 * | 12/2013 | Sombrin | H03F 1/3247 375/297 |
| 2015/0214987 | A1 * | 7/2015 | Yu | H04B 1/0475 375/297 |
| 2016/0072457 | A1 * | 3/2016 | Subrahmaniyan Radhakrishnan | H03F 1/0227 375/219 |

* cited by examiner

*Primary Examiner* — Jean B Corrielus
(74) *Attorney, Agent, or Firm* — Foley & Lardner LLP

(57) ABSTRACT

A system includes baseband circuitry and a transmitter. The electrical behavior of the transmitter may cause distortion effects in the transmit output of the transmitter during transmissions based on input signals from the baseband circuitry. The baseband circuitry may reference a calibration evaluation function for multiple transmit variables to pre-distort the input signal to compensate for the distortion effect. Pre-distortion calibration logic may generate the evaluation function using a one-dimensional calibration technique. The evaluation function may facilitate the baseband accessing calibration data without necessarily relying on a look-up table. In some cases, a one-dimensional calibration for multiple transmit variables may use fewer calibration points than a similarly accurate multi-dimensional calibration.

20 Claims, 14 Drawing Sheets

US 9,577,685 B1

PRE-DISTORTION CALIBRATION

PRIORITY CLAIM

This application claims priority to provisional application Ser. No. 62/289,649, filed Feb. 1, 2016, which is entirely incorporated by reference.

TECHNICAL FIELD

This disclosure relates to signal transmission. This disclosure also relates to interference cancellation in wireless communication technologies such as those implemented in cellular telephones and other devices.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Furthermore, past estimates have indicated that, as just three examples, the United States, Italy, and the UK have more mobile phones in use in each country than there are people even living in those countries. Improvements in wireless communication devices, particularly in their robustness to interference effects, will help continue to make such devices attractive options for the consumer.

DETAILED DESCRIPTION

In radio frequency (RF) transmission technologies, transmission may be distorted by non-linearities such as phase modulation-phase modulation (PM-PM), amplitude modulation-amplitude modulation (AM-AM), PM-AM, and AM-PM, IQ imbalance/mismatch, local oscillator feedthrough (LOFT), DC offsets, or other sources of distortion occurring as a result of transmission. In some cases, signals may be pre-distorted such that the resultant signal post-distortion matches or approximates a desired transmit output.

Figure 1:
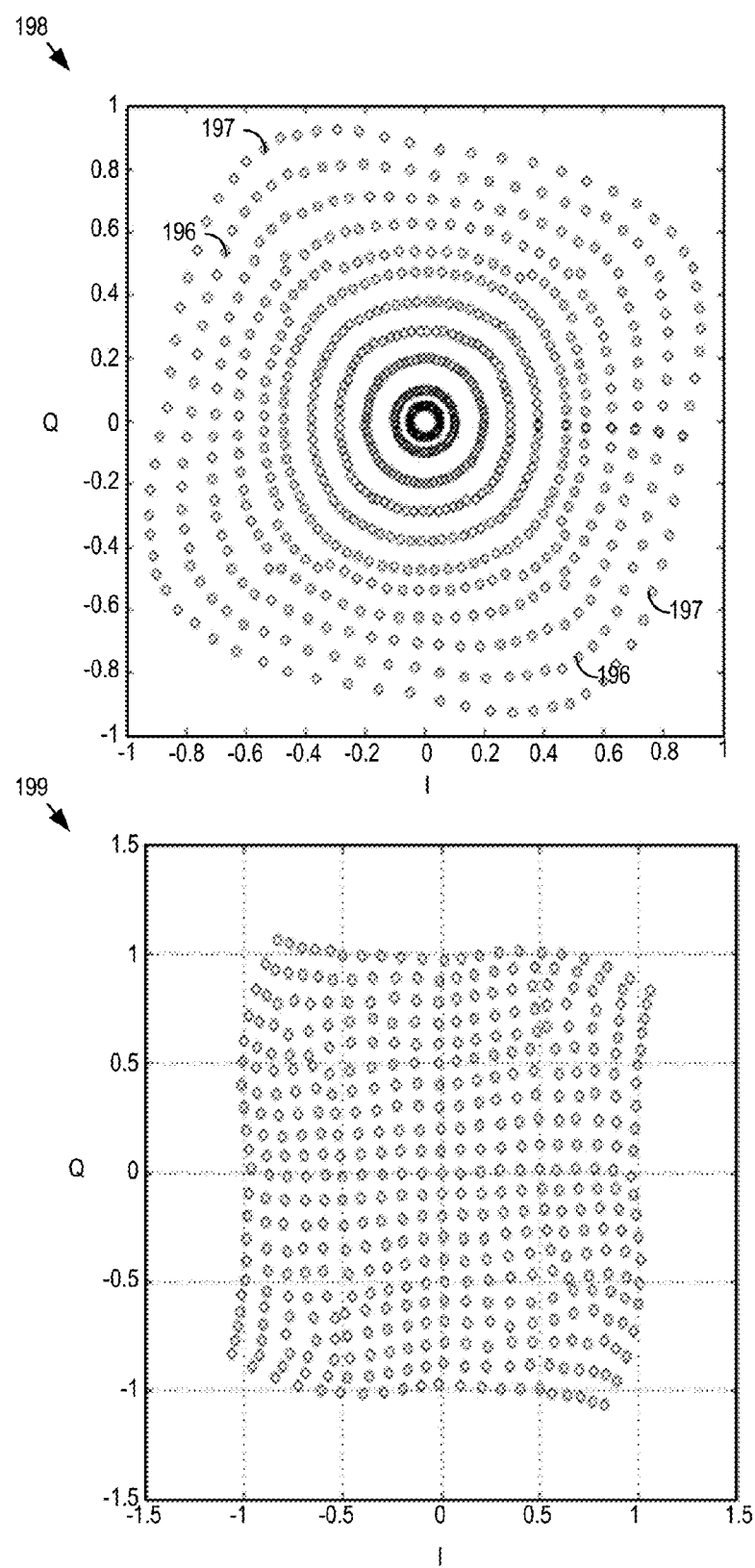
FIG. 1 shows two plots of example distortion in transmission output.

FIG. 1 shows two plots 198, 199 of example distortion in transmission output. The first plot 198 shows a constellation diagram for a predefined IQ profile for an integrated power amplifier (iPA). In this example, the signal input from the baseband caused the transmitter to transmit symbols defining a series of concentric circles, e.g. symbols moving circularly around the constellation by varying phase and keeping amplitude constant. The first plot 198 shows that without pre-distortion, the resulting actual transmission output of the constellation points, (e.g., the constellation points 196, 197) are misaligned with respect to the circular pattern specified by the baseband.

The second plot 199 shows a constellation diagram for a predefined IQ profile for iPA. In this example, the signal input from the baseband was a grid of points oriented along straight vertical and horizontal lines. However, in the output shown in the plot 199, the resulting transmission output shows the points deviating from the grid pattern.

In the plots 198, 199, the shown patterns of distortion are periodic with regard to the phase of the input signal. In both cases shown, the period is $\pi/2$. Distortion sources may exhibit periodicity with respect to phase. Some distortion sources may exhibit a period of $\pi/2$ such as those shown in plots 198, 199. Other distortion sources may exhibit other periods, e.g., $\pi/4$, $\pi$, $2\pi$, or other periods.

In some cases, a look-up table of pre-distortion values indexed by transmit variables, e.g., amplitude and phase, of a multi-dimensional parameter space may be used to facilitate pre-distortion of input signals, e.g., from baseband circuitry. The baseband control circuitry may perform a multi-dimensional, e.g., two-dimensional (2D), calibration by varying the transmit variables over multi-dimensional parameter space. To cover a 2D parameter space, the baseband circuitry may take N×M samples, where N is the number of values over which first transmit variable varies and M is the number of value over which the second transmit variable varies. Thus, for a 2D calibration, the number of samples taken by the baseband circuitry may grow with the square of the radius of the parameter space covered by the calibration. The time that the baseband circuitry takes to complete calibration may grow with the number of samples taken.

In cases where a look-up table is used, the baseband circuitry may index the pre-distortion values by their corresponding transmit variables. Thus, for a multi-dimensional parameter space, the baseband circuitry may use a multi-dimensional memory device. During design of an RF device, the multi-dimensional memory may be selected to have refresh and seek speeds that correspond to, or exceed, those needed to support the modulation rate of the RF device.

In some RF devices, baseband circuitry may use one-dimensional calibration techniques, e.g. calibration techniques where one transmit variable is varied while other transmit variable(s) are held constant. Additionally or alternatively, baseband circuitry may use evaluation functions, e.g., functions of desired transmit output variables, to calculate the corresponding pre-distortion inputs instead of performing a look-up in a multi-dimensional table, e.g., table-free operation. Thus, table-free operation may be used when an available, e.g., available to the baseband circuitry, representation of the relationship between the desired transmit output and the input signals is an evaluation function. Baseband circuitry may use one-dimensional calibration techniques in conjunction with evaluation functions or lookup tables. Further, evaluation functions may be generated by baseband circuitry using one- or multi-dimensional calibration techniques. In some cases, baseband circuitry may execute an evaluation function to generate entries for a look-up table and then index the entries according to the corresponding desired transmit output variables.

The following discussion relates to techniques and architectures for performing one-dimensional calibration over multi-dimensional parameter spaces characterized by multiple transmit variables, and techniques and architectures for generating evaluation functions that produce pre-distortion inputs when evaluated using desired transmit outputs.

Figure 2:
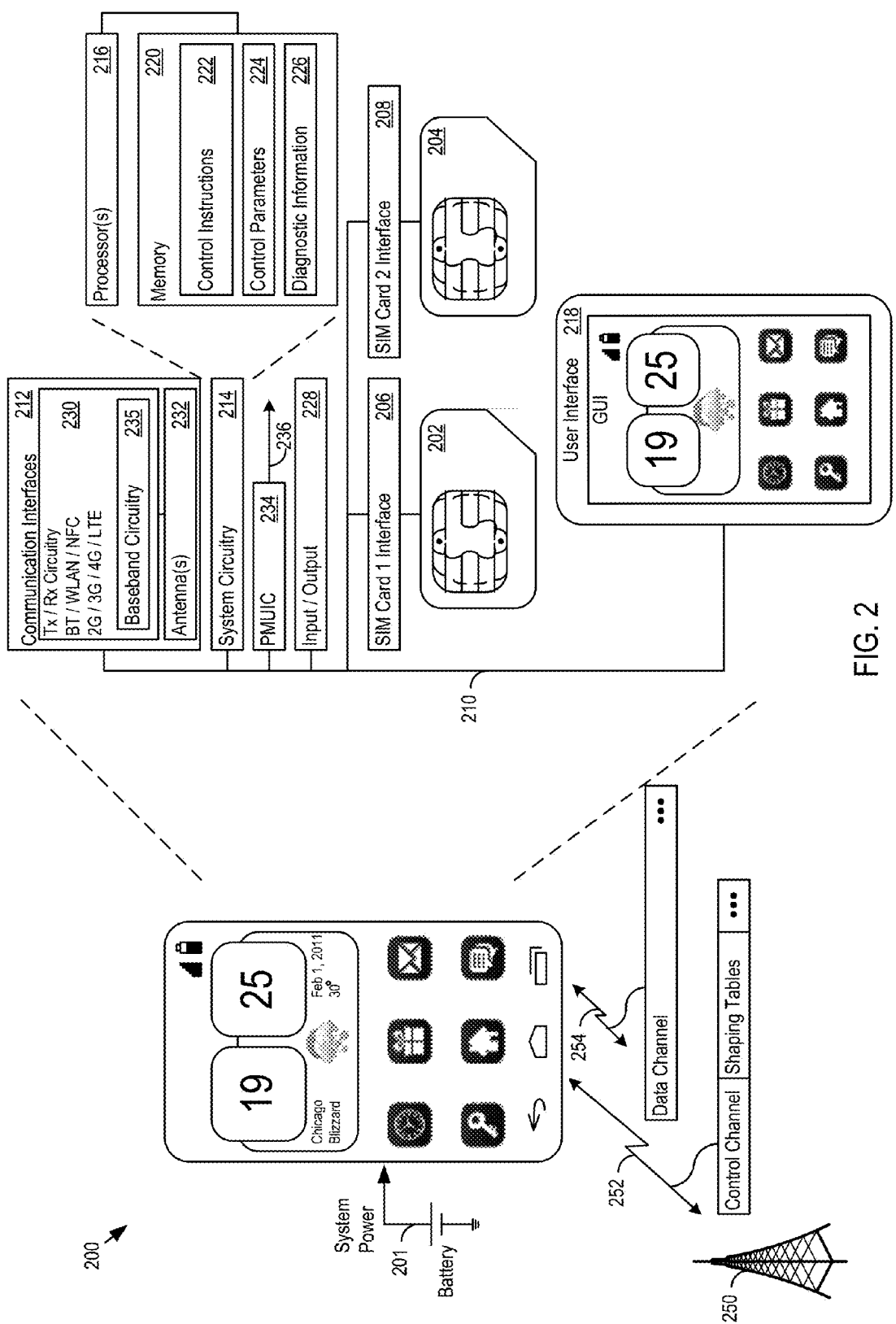
FIG. 2 shows an example of user equipment.

FIG. 2 shows an example of user equipment 200 ("UE 200"). The UE 200 is a smartphone in this example, but the UE 200 may be any electronic device. The techniques described below regarding pre-distortion calibration may be implemented in a wide array of different types of devices. Accordingly, the smartphone example described below provides just one example context for explaining the pre-distortion calibration techniques discussed herein.

As one example, UE 200 may be a 2G, 3G, or 4G/LTE cellular phone capable of making and receiving wireless phone calls, and transmitting and receiving data using 802.11a/b/g/n/ac/ad ("WiFi"), Bluetooth (BT), Near Field Communications (NFC), or any other type of wireless technology. The UE 200 may also be a smartphone that, in addition to making and receiving phone calls, runs any number or type of applications. UE 200 may, however, be virtually any device that transmits and receives information either wirelessly or via guided media, including as additional examples a driver assistance module in a vehicle, an emergency transponder, a pager, a satellite television receiver, a networked stereo receiver, a computer system, a wireless access point, cellular base station, a router, a bridge, a music player, optical or infrared transceivers, or virtually any other device.

FIG. 2 shows an example of the UE 200 in communication with a network controller 250, such as an enhanced Node B (eNB) or other base station. The network controller 250 and UE 200 establish communication channels such as the control channel 252 and the data channel 254, and exchange data. In this example, the UE 200 supports one or more Subscriber Identity Modules (SIMs), such as the SIM1 202 and the SIM2 204. Electrical and physical interfaces 206 and 208 connect SIM1 202 and SIM2 204 to the rest of the user equipment hardware, for example, through the system bus 210.

The UE 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 200. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218.

The user interface 218 and the input/output (I/O) interfaces 228 may include a graphical user interface, touch sensitive display, voice or facial recognition inputs, buttons, switches, speakers and other user interface elements. Additional examples of the I/O interfaces 228 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interfaces 228 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The system logic 214 may include one or more processors 216 and memories 220. The memory 220 stores, for example, control instructions 222 that the processor 216 executes to carry out desired functionality for the UE 200. The control parameters 224 provide and specify configuration and operating options for the control instructions 222. The memory 220 may also store any BT, WiFi, 3G, or other data 226 that the UE 200 will send, or has received, through the communication interfaces 212. The UE 200 may include a power management unit integrated circuit (PMUIC) 234. In a complex device like a smartphone, the PMUIC 234 may be responsible for generating as many as thirty (30) different power supply rails 236 for the circuitry in the UE 200. The system power of the UE 200 may be supplied by a battery 201 or other power source.

In the communication interfaces 212, RF transmit (Tx) and receive (Rx) circuitry 230 handles transmission and reception of signals through one or more antennas 232. The RF Tx/Rx circuitry 230 may include baseband circuitry 235 to control the processing of transmitted and received signals. For example, the baseband circuitry may perform pre-distortion calibrations and pre-distort input signals for transmission. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Distortion in Digital Transmitters

Figure 3:
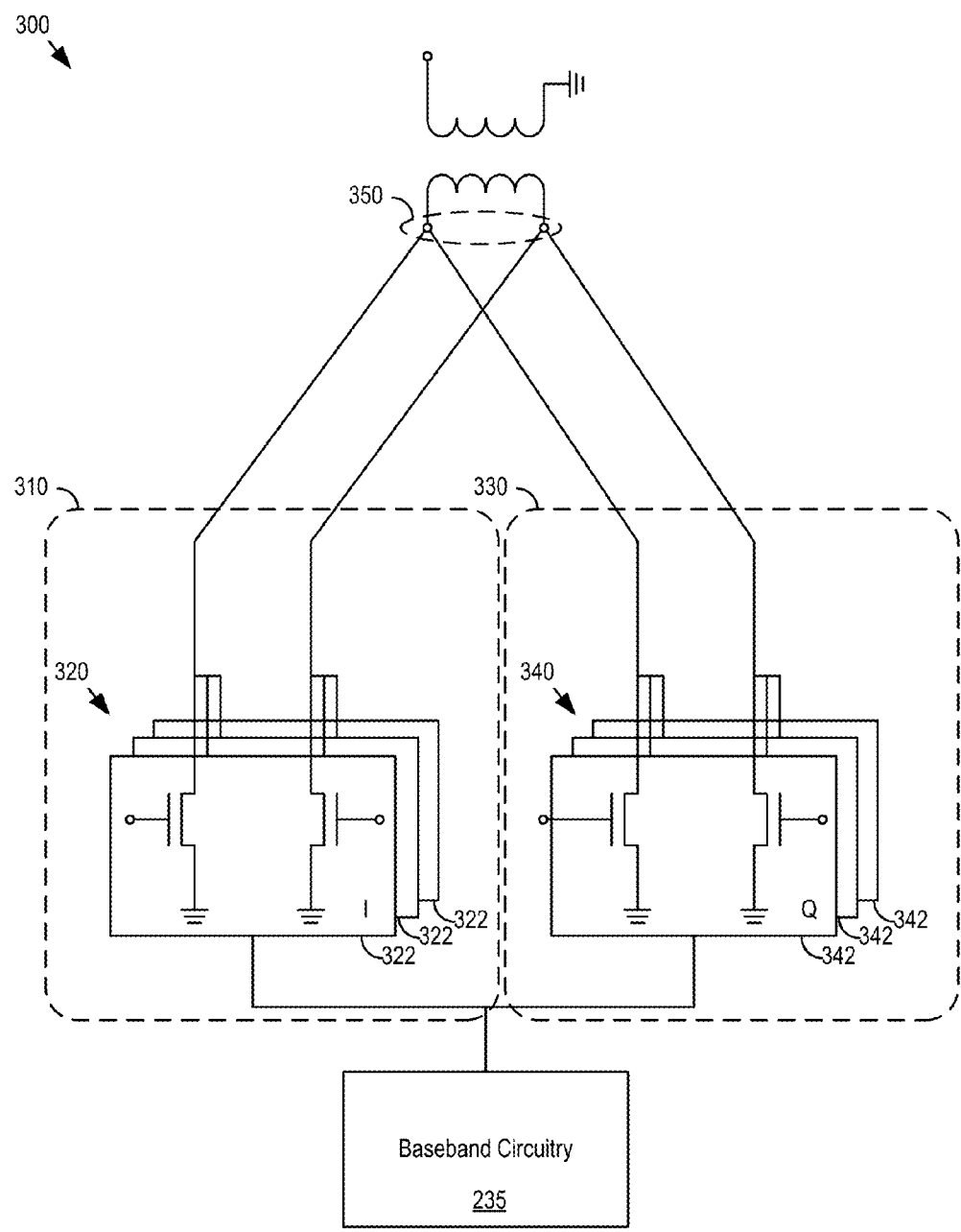
FIG. 3 shows an example digital transmitter.

FIG. 3 shows an example digital transmitter 300. In an example scenario, the example digital transmitter may be included in the Tx/Rx circuitry 230 of the UE 200. The example digital transmitter 300 may include baseband circuitry 235, which may perform one-dimensional pre-distortion calibration as discussed below. The digital transmitter 300 may further include I and Q channels 310, 330 coupled to the baseband circuitry 235. The I and Q channels 310, 330 may include digital amplifiers 320, 340, which may be made up of current source fingers 322, 342. The current source fingers 322, 342 may be unitary current sources with binary on/off states. Thus, the baseband circuitry 235 may unitarily increase or decrease amplitude of the I channel 310 output by turning on or off one of the I-channel current source fingers 322. Similarly, the baseband circuitry 235 may unitarily increase or decrease the Q-channel 330 amplitude by switching Q-channel current source figures 342. In FIG. 3, three current source fingers 322, 342 are shown for each of the I and Q channels 310, 330. However, virtually any number of current source fingers may be used. For example, to generate a 256-QAM, 16 fingers for each of the I and Q channels 310, 330 may be used.

The outputs of the I-channel current source fingers 322 may be fused to one another. The outputs of the Q-channel current source fingers 342 may be fused to one another. Further, the I and Q channels 310, 330 outputs may be mixed at junction 350. Thus, the response of the system from each of the current source finger 322, 342 may depend on the other current source fingers active within the I or Q channel 310, 330. The response of the system from each of the current source finger 322, 342 may further depend on the current source fingers active in the opposite channel. These dependencies may lead to non-linear current mixing within and among the I and Q channels 310, 330. Additionally or alternatively, where the I and Q channels 310, 330 are unbalanced with regard to DC amplitude output calibration, I-Q mismatch may occur.

Although sources of distortion within an example digital transmitter are shown herein for illustration, distortion may occur in analog transmitter designs, and distortion may also occur in digital transmitter designs with separated I and Q channels. The calibration techniques discussed herein may be applied to virtually any transmitter that produces distortion in its output.

One-Dimensional Pre-Distortion Calibration

To compensate for the distortion occurring as a result the distortion sources discussed above and other distortion sources, baseband circuitry may implement one-dimensional (1D) pre-distortion calibration. 1D pre-distortion calibration for systems with multiple transmit variables, e.g. phase and amplitude, may be performed by varying a first transmit variable constant while holding the other transmit variables of the system constant. The process may be repeated for multiple values of the variables that are held constant to cover a multiple-dimensional section of a parameter space characterized by the transmit variables.

Figure 4:
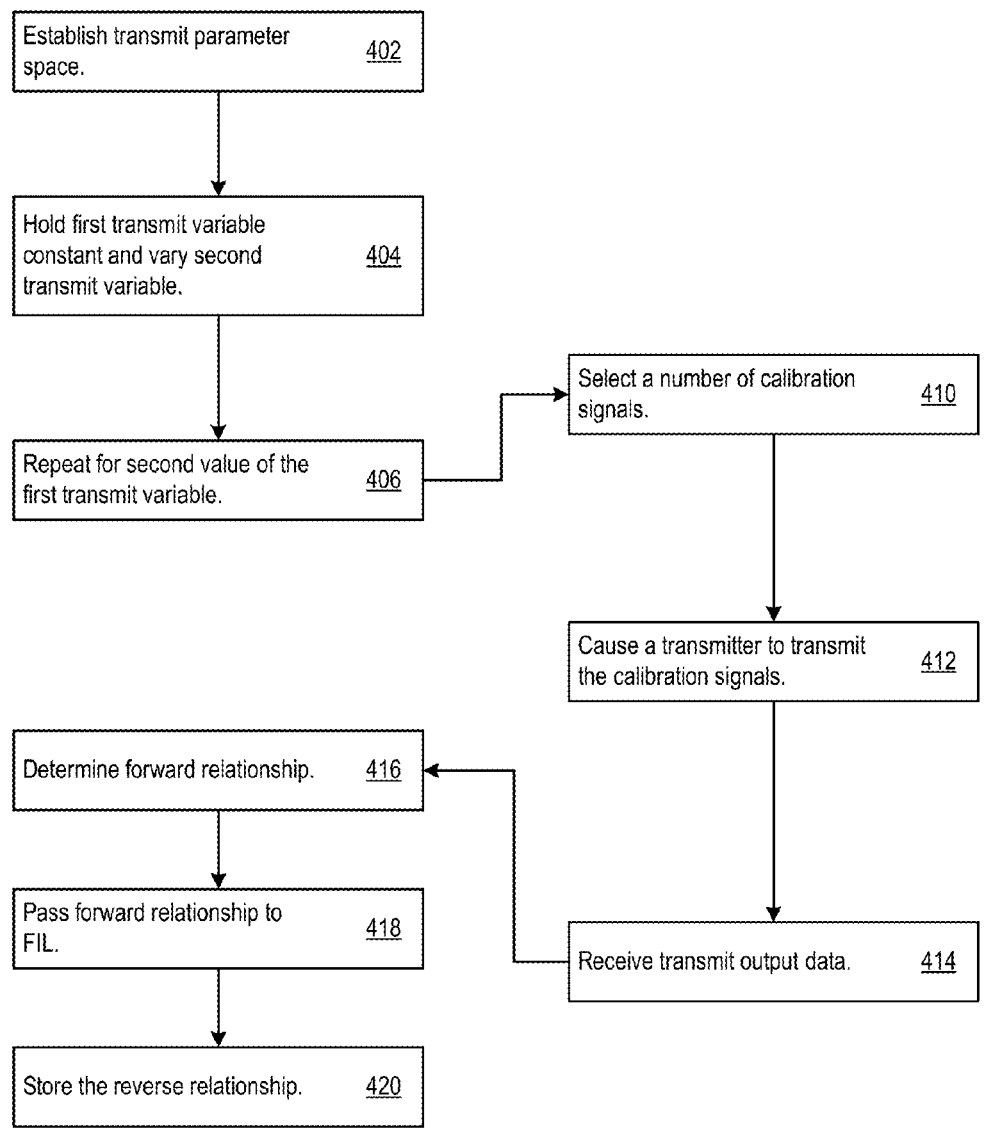
FIG. 4 shows example pre-distortion calibration logic.

FIG. 4 shows example pre-distortion calibration logic (PDCL) 400, which may be implemented on circuitry, e.g., baseband circuitry 235. The PDCL 400 may establish a transmit signal parameter space defined by the transmit variables of the system (402). For example, the transmit signal parameter space may be 2D space defined by phase and amplitude. In some cases, the phase and amplitude variables may be used as polar coordinates to define the parameter space. In another example, I and Q amplitudes may be used to define Cartesian coordinates in a 2D parameter space. Other transmit variables, such as pulse duration, or symbol bandwidth, may be used to define alternative or additional transmit variables for n-dimensional transmit signal parameter spaces.

The PDCL 400 may define a calibration pattern by holding a first transmit variable of the transmit variables of the system constant, and varying a second transmit variable (404). For example, in a phase-amplitude parameter space, holding phase constant while varying amplitude will generate a line extending radially from the origin (e.g., zero amplitude point) of the parameter space. In phase-amplitude parameter space, holding amplitude constant while varying phase will generate a circle centered at the origin of the parameter space.

The PDCL 400 may further define the calibration pattern by shifting the value of the first transmit variable to another value and then again varying the second transmit variable (406). The PDCL 400 may repeatedly shift the value of the first transmit variable and vary the second transmit variable to cover multiple selected values for the first transmit variable. For example, in a phase-amplitude parameter space, repeated shifting and varying may define several lines extending radially from the original when phase is the transmit variable that is held constant. Similarly, several concentric circles may be defined by the PDCL 400 when amplitude is held constant.

The PDCL 400 may select a number of calibration signals within the bounds of the calibration pattern (410). For example, the PDCL 400 may select the calibration signals by selecting random values of the varied variable for values of the variables held constant. As an illustration, in a phase-amplitude space, the PDCL 400 may select calibration signals such that that the signals lie at the same set of amplitudes along each of the radially extending constant phase lines. In another example, pre-selected values of the varied variable for each of the values of variable held constant may be used as calibration signals by the PDCL 400.

The PDCL 400 may cause a transmitter, for example, a digital transmitter coupled to baseband circuitry, to transmit the calibration signals (412). In some cases, the calibration signals may be transmitted such that one variable is held constant for a while other variables vary. For example, the calibration signals may be transmitted in groups with constant phase or constant amplitude. However, in some systems, once the calibration signals are selected, the calibration signals may be transmitted in any order, for example, a random order. For example, the PDCL 400 may vary both phase and amplitude from one transmitted calibration signal to the next, e.g., while transmitting the selected calibration signals in a random order.

The PDCL 400 may then receive, for example from RF receiver circuitry, transmit output data that includes measurement data on the transmit output that corresponds to the calibration signals (414).

Once the PDCL 400 receives the transmit output data, the PDCL 400 may determine a forward relationship that relates the calibration signal inputs to the transmit outputs (416). The forward relationship may be represented by the PDCL 400 using an evaluation function, e.g., a function the produces transmit output values when a baseband signal input is supplied. Two example techniques (one for a constant phase calibration pattern and another for a constant amplitude calibration) that may be used, e.g. by baseband circuitry, to determine forward relationships in phase-amplitude parameter space are discussed below. However, virtually any technique for generating an evaluation function relationship between two data sets of discrete coordinates may be used to determine a forward relationship that relates the calibration signal inputs to the transmit outputs.

Once the forward relationship is determined, the PDCL 400 may pass the forward relationship to FIL 500, discussed below, to invert the forward relationship to generate a reverse relationship that relates a desired transmit output to a corresponding baseband input (418). The FIL 500 may invert the evaluation function the represents the forward relationship to perform the inversion. Virtually any technique of function inversion, for example, analytical, numerical, iterative or other inversion method, may be used to obtain an evaluation function that represents the reverse relationship.

Once the reverse relationship is determined, the PDCL 400 may store the relationship to facilitate transmission pre-distortion for the transmitter (420).

In some implementations, the evaluation function representation of the reverse relationship may be stored, e.g., for use in real-time calculation of transmit variable inputs for table-free operation the pre-distortion system. Alternatively, the PDCL 400 may pre-calculate input transmit variable values for various desired output values for use in look-up table based operation of the pre-distortion system.

Figure 5:
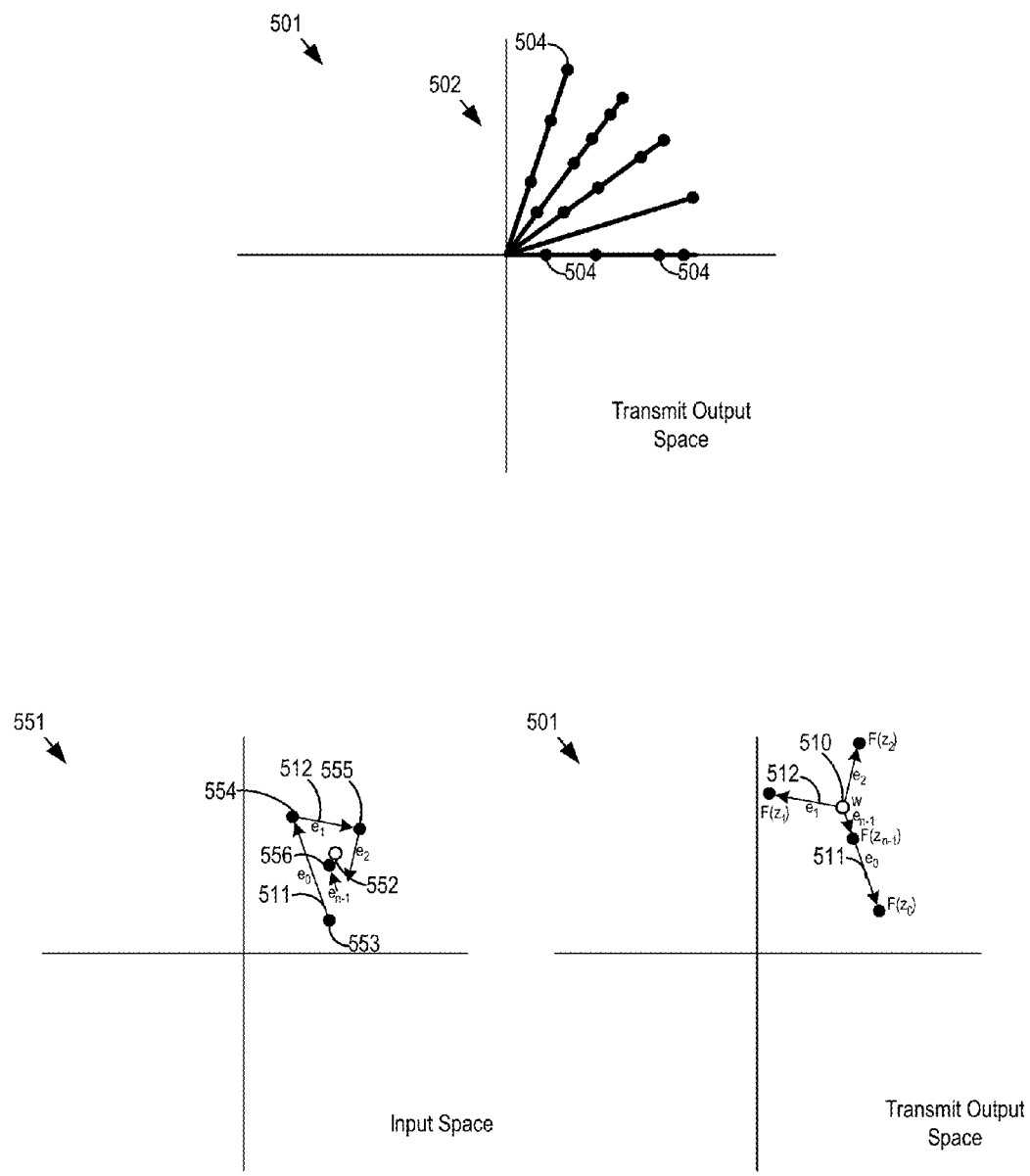
FIG. 5 shows example function inversion logic.

Returning again to the discussion of evaluation function inversion, FIG. 5 shows example function inversion logic (FIL) 500 for generating an inverse function $G(z')$ for a function $F(z)$. The FIL 500 selects a calibration pattern in transmit output space 501. The calibration pattern 502 may be selected such that, once the corresponding inputs are known for the points 504 in the calibration pattern, the FIL 500 may generate an evaluation function that presents the inversion function. For example, the FIL 500 may select a calibration pattern including multiple lines of constant phase in a phase-amplitude space. As discussed below, an evaluation function for a calibration pattern including multiple lines of constant phase may be determined when corresponding numerical evaluation values are known for points within the calibration pattern.

Once the calibration pattern 502 for the transmit output space is selected, the FIL 500 determines corresponding input parameter values that correspond to points 504 on the selected calibration pattern in transmit output space 501.

To determine the input value, $G(w)$ 552, in input space 551 for a given output point, w 510, in transmit output space 501, when the forward relationship, F, is known:

The FIL 500 may evaluate $F(w)$, which yields $F(w)=z_0$ 553.

The FIL 500 may then evaluate $F(z_0)-w=e_0$ 511.

The FIL 500 may then evaluate $F(z_0-e_0)$, which yields $F(z_0-e_0)=z_1$ 554.

The FIL 500 may then evaluate $F(z_1)-w=e_1$ 512.

The FIL 500 may then evaluate $F(z_1-e_1)$, which yields $F(z_1-e_1)=z_2$ 555.

The FIL 500 may repeat n iterations until it evaluates $F(z_{n-1}-e_{n-1})$, which yields $F(z_{n-1}-e_{n-1})=z_n$ 556.

The iterative calculation of the FIL 500 may be restated as $z_n=F( \ldots F(F(F(w)-e_0)-e_1)-e_2) \ldots -e_{n-1})$.

The successive values of $z_x$ approach $G(w)$ 552. Thus, the FIL 500 may select n to achieve a desired precision. For example, the FIL 500 may access a stored parameter indicating the number of iterations. Additionally or alternatively, the FIL 500 may iterate until a stored precision metric of threshold is met. For example, the FIL 500 may iterate until the magnitude of $e_n$ (or $|e_n-e_{n-1}|$, e.g., $\Delta e_n$) falls below a defined threshold. In some cases, a fixed value, such as n=3, may be used.

The FIL 500 may repeat for other points 504 in the calibration pattern 502.

Once the corresponding input values are determined for the points 504 in the calibration pattern 502. The evaluation function for the reverse relationship may be determined using an evaluation function generation technique valid for the selected calibration pattern 502.

Two examples of generating evaluation functions from calibration patterns in phase-amplitude parameter space are discussed below.

1D Calibration over Lines of Constant Phase

In phase-amplitude parameter space, a first type of calibration pattern may be defined by be holding phase constant while varying amplitude. The phase may be held constant for multiple values of the phase to define a calibration pattern including multiple lines of constant phase extending radially from the origin, e.g., a point of zero amplitude in the parameter space.

In phase-amplitude parameter space, effects on signals are periodic in phase. For example, a distortion effect for a signal with a given amplitude and phase, $\phi$, may be the same as the distortion effect for a signal with the same amplitude and phase, $\phi+2\pi$ or phase $\phi-2\pi$. However, shorter periods are also possible. For example, some non-linear distortion effects have a period of $\pi/2$ in phase. As another example, in some cases, distortion due to I-Q mismatch may have a period of $\pi$ in phase. Accordingly, distortion effects with a period of $\pi/2$ or $\pi/n$, where n is an integer, are also periodic with $\pi$ and $2\pi$. Thus, if a system experiences multiple distortion effects one of which with a period of $\pi/2$ and another with a period of $\pi$, both distortion effects may be compensated using a calibration scheme that has a period of $\pi$ with respect to phase.

Figure 6:
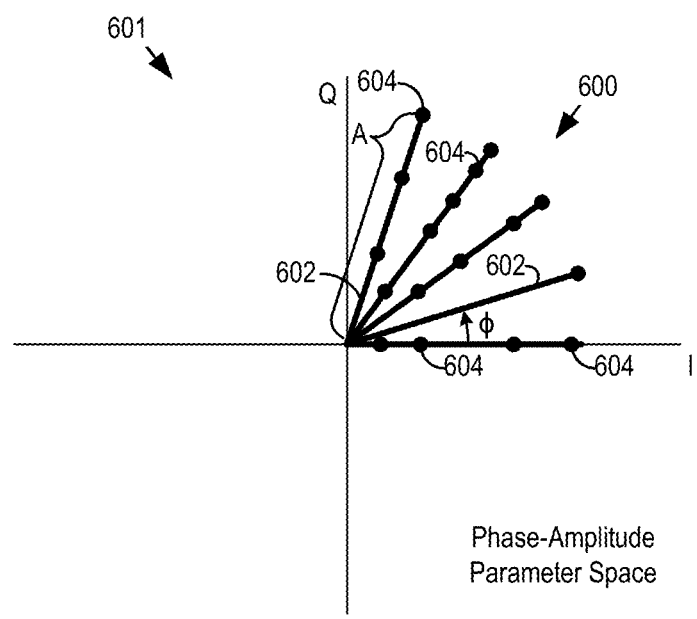
FIG. 6 shows an example calibration pattern including lines of constant phase.

FIG. 6 shows an example calibration pattern 600 including lines of constant phase. The lines 602 of the calibration pattern 600 cover only one quadrant of the phase-amplitude parameter space 601. However, for a distortion effect with a period of $\pi/2$ in phase, a calibration for a single quadrant may be applied to other quadrants.

Figure 7:
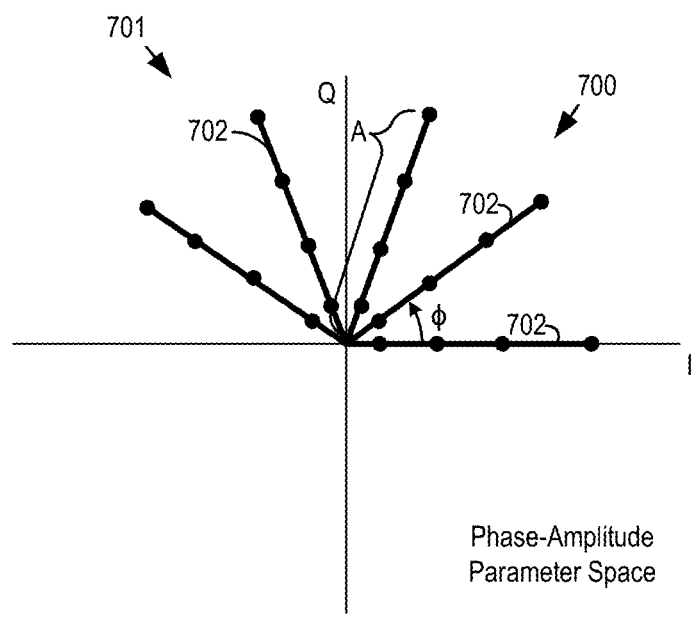
FIG. 7 shows an example calibration pattern including lines of constant phase.

FIG. 7 shows another example calibration pattern 700 including lines of constant phase. The lines 702 of the calibration pattern 700 cover two neighboring quadrants of the phase-amplitude parameter space 701. A two quadrant calibration pattern may be used by the PDCL 400 to compensate for distortion patterns with a period of $\pi$.

Referring again to, FIG. 6, the lines 602 of constant phase are distributed over the quadrant of interest in the phase-amplitude space. The distribution of lines may be periodic in phase, e.g., regularly distributed to break the quadrant into equally sized wedges, or aperiodically distributed, e.g., to break the quadrant into unequally sized wedges. The distribution of lines may be set a priori or may be set dynamically. For example, as transmission outputs are measured for calibration signals 604, the PDCL 400 may measure point-to-point changes in output. Where distortion effects cause more rapid changes, e.g., as measured by a real-time derivative calculation, lines 602 may be more closely spaced. Where changes are measured to be more slowly changing, lines 602 more be comparatively less densely packed by the PDCL 400.

In the example calibration pattern 600, five equally spaced lines 602 of constant phase are used by the PDCL 400.

Within the lines 602, the PDCL 400 may define calibration signals 604 by selecting amplitude levels at which to have transmit output measurements made. The selected amplitude levels may be evenly distributed along the lines or unevenly distributed. The amplitude levels may be selected a priori or selected dynamically. For example, defined calibration signals may be more densely clustered where the transmit output for a line 602 varies the more quickly for neighboring points. In another example, calibration signals 604 may be selected a priori and clustered more closely together as the amplitude increases. Further, the amplitude levels at which calibration signals 604 are defined may be the same for each line 602 or the amplitude levels may differ among lines 602. Further, the number of calibration signals per line may be the same or differ among the lines 602.

The number of lines 602 may be increased to increase the precision with which PDCL 400 determines the function that relates input signals to the transmit output. The number calibration signals 604 may also be increased to increase the precision with PDCL 400 determines the function. The number of lines and calibration signals used by the PDCL 400 may be selected based on desired calibration time, calculation complexity, desired precision, or other parameters.

Once the PDCL 400 defines the calibration signals 604 or the scheme for dynamic selection of the calibration signals 604, the PDCL 400 may cause measurement of transmit outputs for the calibration signals 604.

The function that produces the transmit outputs may be referred to as $F(A,\phi)$, where A is the input amplitude and $\phi$ is the input phase, e.g., for a calibration signal or other input signal.

Since some distortion effects are periodic in phase, $F(A,\phi)e^{-j\phi}$ is periodic in phase and may be represented as a Fourier series:

$$F(A, \phi) = \left(\sum_{n=-\infty}^{n=+\infty} F_n(A) e^{j\left(\frac{2\pi}{T}\right)n\phi}\right) e^{j\phi}$$

Where T is the period of the distortion effect and $F_n(A)$ is a function of A that is independent of $\phi$.

$F(A,\phi)$ may be approximated by truncated Fourier series created by taking the first few terms of the series. For example, the PDCL 400 may create a truncated Fourier series by using a set of the lowest order terms in $e^{j\phi}$.

For a distortion effect that has a period of $\pi/2$ the first five terms are:

$$F(A,\phi) \approx (F_{-2}(A)e^{-j8\phi} + F_{-1}(A)e^{-j4\phi} + F_0(A) + F_1(A)e^{j4\phi} + F_2(A)e^{j8\phi})e^{j\phi}$$

For a distortion effect that has a period of $\pi$ the first five terms are:

$$F(A,\phi) \approx F_{-2}(A)e^{-j3\phi} + F_{-1}(A)e^{-j\phi} + F_0(A)e^{j\phi} + F_1(A)e^{j3\phi} + F_2(A)e^{j5\phi} + F(0)$$

Thus, for either of the truncated Fourier series, the function may be approximated by determining the vectors $F_n(A)$.

The PDCL 400 may calculate the vectors $F_n(A)$ for a calibration pattern with five lines of constant phase and a distortion pattern with period $\pi/2$ using the following matrix equation:

$$\begin{pmatrix} F_{-2}(A) \\ F_{-1}(A) \\ F_0(A) \\ F_1(A) \\ F_2(A) \end{pmatrix} = \begin{pmatrix} e^{-j8\phi_0} & e^{-j4\phi_0} & 1 & e^{j4\phi_0} & e^{j8\phi_0} \\ e^{-j8\phi_1} & e^{-j4\phi_1} & 1 & e^{j4\phi_1} & e^{j8\phi_1} \\ e^{-j8\phi_2} & e^{-j4\phi_2} & 1 & e^{j4\phi_2} & e^{j8\phi_2} \\ e^{-j8\phi_3} & e^{-j4\phi_3} & 1 & e^{j4\phi_3} & e^{j8\phi_3} \\ e^{-j8\phi_4} & e^{-j4\phi_4} & 1 & e^{j4\phi_4} & e^{j8\phi_4} \end{pmatrix}^{-1} \begin{pmatrix} e^{-j\phi_0}F(A,\phi_0) \\ e^{-j\phi_1}F(A,\phi_1) \\ e^{-j\phi_2}F(A,\phi_2) \\ e^{-j\phi_3}F(A,\phi_3) \\ e^{-j\phi_4}F(A,\phi_4) \end{pmatrix}$$

Where the values $\phi_n$ are the constant phase values selected for the calibration signals and where $F(A,\phi_n)$ may be determined using the measured transmit outputs corresponding to the calibration signals.

The PDCL 400 may calculate the vectors $F_n(A)$ for a calibration pattern with five lines of constant phase and a distortion pattern with period 1T using the following matrix equation:

$$\begin{pmatrix} F_{-2}(A) \\ F_{-1}(A) \\ F_0(A) \\ F_1(A) \\ F_2(A) \end{pmatrix} = \begin{pmatrix} e^{-j3\phi_0} & e^{-j\phi_0} & e^{j\phi_0} & e^{j3\phi_0} & e^{-j5\phi_0} \\ e^{-j3\phi_1} & e^{-j\phi_1} & e^{j\phi_1} & e^{j3\phi_1} & e^{-j5\phi_1} \\ e^{-j3\phi_2} & e^{-j\phi_2} & e^{j\phi_2} & e^{j3\phi_2} & e^{-j5\phi_2} \\ e^{-j3\phi_3} & e^{-j\phi_3} & e^{j\phi_3} & e^{j3\phi_3} & e^{-j5\phi_3} \\ e^{-j3\phi_4} & e^{-j\phi_4} & e^{j\phi_4} & e^{j3\phi_4} & e^{-j5\phi_4} \end{pmatrix}^{-1} \begin{pmatrix} F(A, \phi_0) - F(0) \\ F(A, \phi_1) - F(0) \\ F(A, \phi_2) - F(0) \\ F(A, \phi_3) - F(0) \\ F(A, \phi_4) - F(0) \end{pmatrix}$$

Where the values $\phi_n$ are the constant phase values selected for the calibration signals and where $F(A,\phi_n)$ may be determined using the measured transmit outputs corresponding to the calibration signals.

Once an evaluation function for a forward representation, e.g., $F(A,\phi)$, is known, an evaluation functions for the reverse relationship may be calculated using FIL 500 of FIG. 5.

Figure 8:
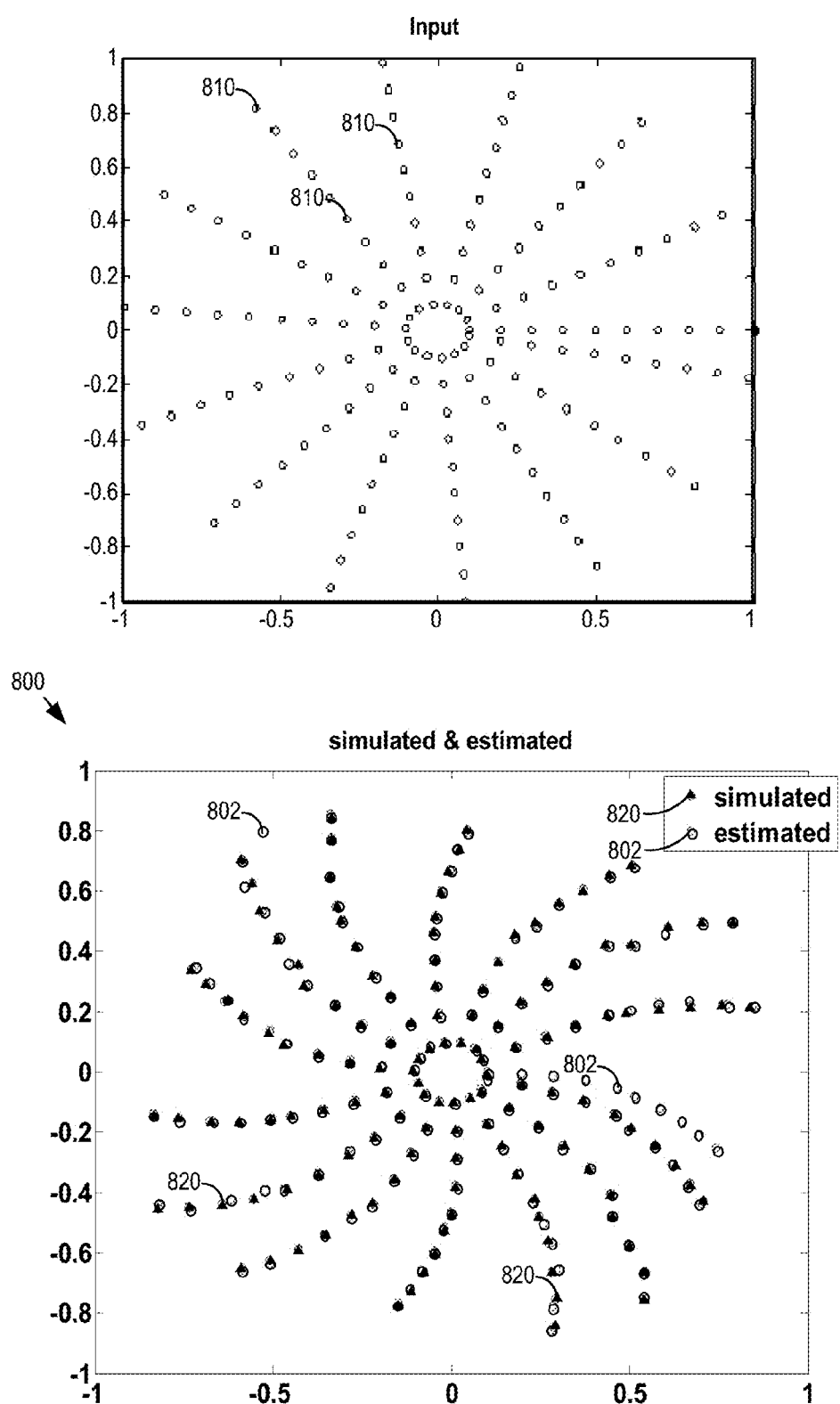
FIG. 8 shows example plot of distortion estimation performance.

FIG. 8 shows example plot 800 of distortion estimation performance using five evenly spaced lines of constant phase at $$\phi = \left\{0, \frac{\pi}{10}, \frac{2\pi}{10}, \frac{3\pi}{10}, \frac{4\pi}{10}\right\}$$

and five Fourier series terms for distortions with a period of $\pi/2$. The input signals 810 are used to produce points of simulated transmit output 820. The points of estimated transmit output 802 are included with simulated output points 820. Estimated transmit output is very close to the simulated output.

Figure 9:
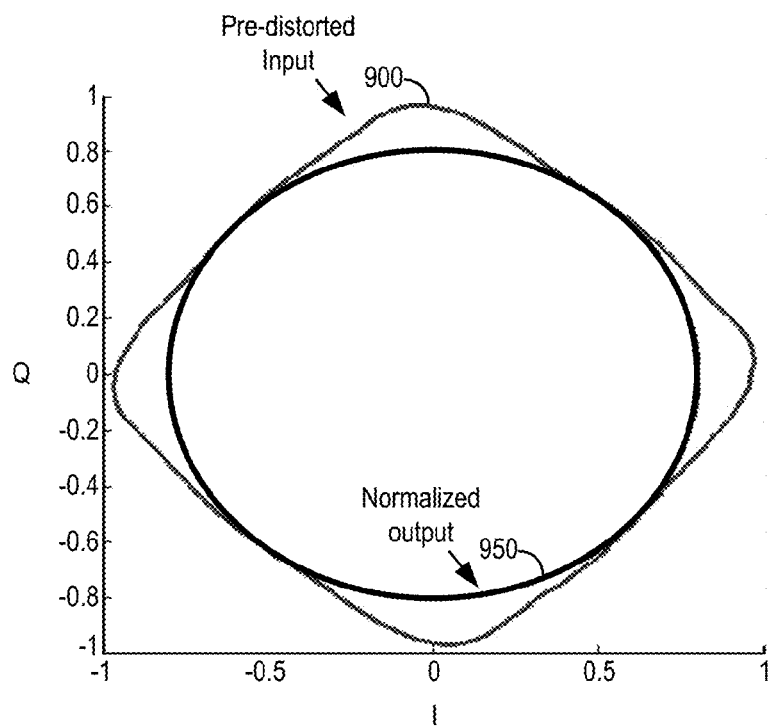
FIG. 9 shows an example pre-distorted baseband input and radio frequency output.

FIG. 9 shows an example pre-distorted baseband input 900 and RF output 950. The pre-distorted baseband input 900 was determined using the distortion estimation parameters of FIG. 8 and the FIL 500 to perform the inversion. The RF output 950 is very close to the circular shape of the desired transmit output.

Table 1 shows reductions in signal mixing components for the RF output of FIG. 9. For a 26 dBm input, LO-3fm and LO+5fm components are reduced by ~20 dB as a result of calibration.

TABLE 1

| 10 MHz Tone | LO + fm | LO + fm (dBm) | LO − 3 fm (dBc) | LO + 5 fm (dBc) | LO − 7 fm (dBc) | LO + 9 fm (dBc) |
| --- | --- | --- | --- | --- | --- | --- |
| With Calibration | 6.27 | 25.95 | −42.13 | −61.5 | −45.93 | −43.13 |
| Without Calibration | 5.93 | 25.46 | −23.21 | −41.91 | −46.18 | −46.87 |

1D Calibration over Circles of Constant Amplitude

In phase-amplitude parameter space, a second type of calibration pattern may be defined by be holding amplitude constant while varying phase. The amplitude may be held constant for multiple values of the amplitude such that a calibration pattern includes multiple concentric circles of constant amplitude centered at the origin, e.g., a point of zero amplitude in the parameter space.

As discussed above, some distortion effects may be represented as a Fourier series with terms:

$$F(A, \phi) = \left( \sum_{n=-\infty}^{n=+\infty} F_n(A) e^{j\left(\frac{2\pi}{T}\right)n\phi} \right) e^{j\phi}.$$

For a system of constant amplitude, $A_c$, and varying phase, $\phi(t)$, the terms may be expressed as:

$$F(A_c, \phi(t)) = \left( \sum_{n=-\infty}^{n=+\infty} F_n(A_c) e^{j\left(\frac{2\pi}{T}\right)(n+1)\phi(t)} \right)$$

Where the phase is allowed to vary randomly, the time averaged value of a term $<F_n(A_c) e^{jB\phi(t)}>$ will tend to zero as time increase for any non-zero value of B.

Thus, the terms $F_n(A_c)$ may be determined by taking calculating:

$$F_n(A_c) = \left\langle F(A_c, \phi(t)) \times e^{-j\left(\frac{2\pi}{T}\right)(n+1)\phi(t)} \right\rangle$$

The factor $$e^{-j\left(\frac{2\pi}{T}\right)(n+1)\phi(t)}$$

will cancel the phase varying factor of $F_n(A_c)$ and all other terms will have non-zero phase factors. Hence, all other terms will tend toward zero as t increases. Thus, the terms $F_n(A_c)$ may be determined from the input, $A_c e^{j\Phi(t)}$, and the measured transmit output.

Once the terms $F_n(A_c)$ are known, the Fourier series representation of the evaluation function for the forward relationship may be constructed. The forward relationship may be inverted, e.g., by FIL 500, to determine the reverse relationship.

For example, for a distortion with a period of $\pi/2$ the first five terms of the Fourier series may be represented as:

$$F(A_c,\phi(t)) \cong F_{-2}(A_c)e^{-j7\phi(t)} + F_{-1}(A_c)e^{j3\phi(t)} + F_0(A_c)e^{j\phi(t)} + F_1(A_c)e^{j5\phi(t)} + F_2(A_c)e^{j9\phi(t)}$$

In the example, the terms $F_n(A_c)$ may be calculated as follows:

$<F(A_c,\phi(t))e^{-j\phi(t)}> = F_0(A_c)$ $<F(A_c,\phi(t))e^{j3\phi(t)}> = F_{-1}(A_c)$ $<F(A_c,\phi(t))e^{-j5\phi(t)}> = F_1(A_c)$ $<F(A_c,\phi(t))e^{j7\phi(t)}> = F_{-2}(A_c)$ $<F(A_c,\phi(t))e^{-j9\phi(t)}> = F_2(A_c)$ The calculations may be repeated for various values of $A_c$.

Figure 10:
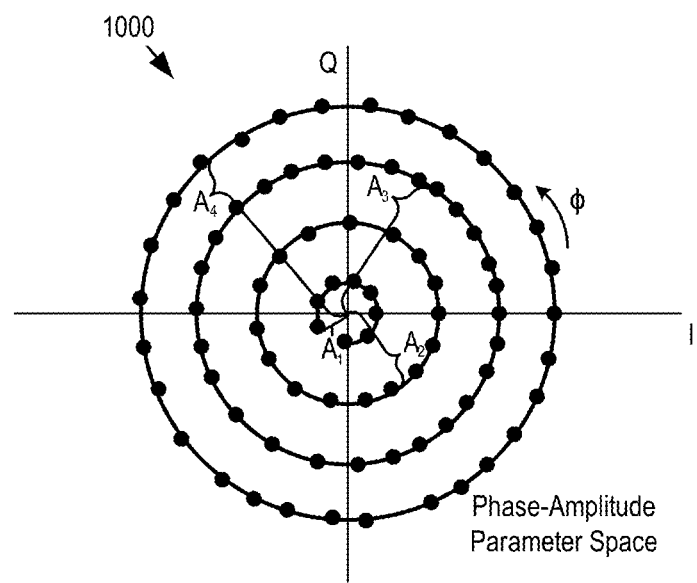
FIG. 10 shows an example calibration pattern with circles of constant amplitude.

FIG. 10 shows an example calibration pattern 1000 with circles of constant amplitude.

Figure 11:
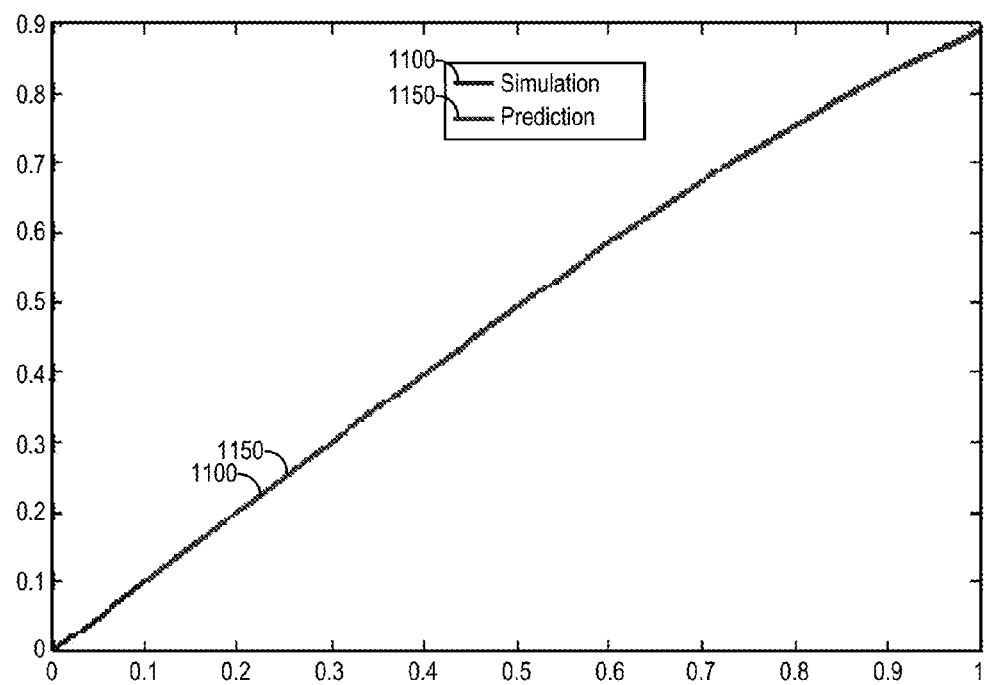
FIG. 11 shows an example plot of simulation versus prediction using circles of constant amplitude with modulated data.

FIG. 11 shows an example plot of simulation 1100 versus prediction 1150 of $F_0(A_c)$ using circles of constant amplitude with modulated data. The plot shows very good agreement between the simulated 1100 and predicted 1150 values.

Calibration Using Modulated Data as Calibration Signals

Calibration may be performed by the PDCL 400 using static tones. For static tone calibration, a transmitter may produce a static tone output using transmit variables supplied by a baseband input as calibration signals. The corresponding transmit output may be measured by receiver circuitry, and then the baseband may signal the transmitter to proceed to the next static tone.

Additionally or alternatively, the PDCL 400 may use modulated data as the calibration signals. For modulated data, the transmit output is spread over the frequency band of the modulated data. For example, the calibration signals may be data symbols sent at a symbol rate of 20 M/s transmitted over a 200 MHz channel, or other symbol rates and frequency bandwidth.

Further, some modulated data systems may use random data. Therefore, the order in which the calibration signals are sent may not necessarily be known a priori.

Figure 12:
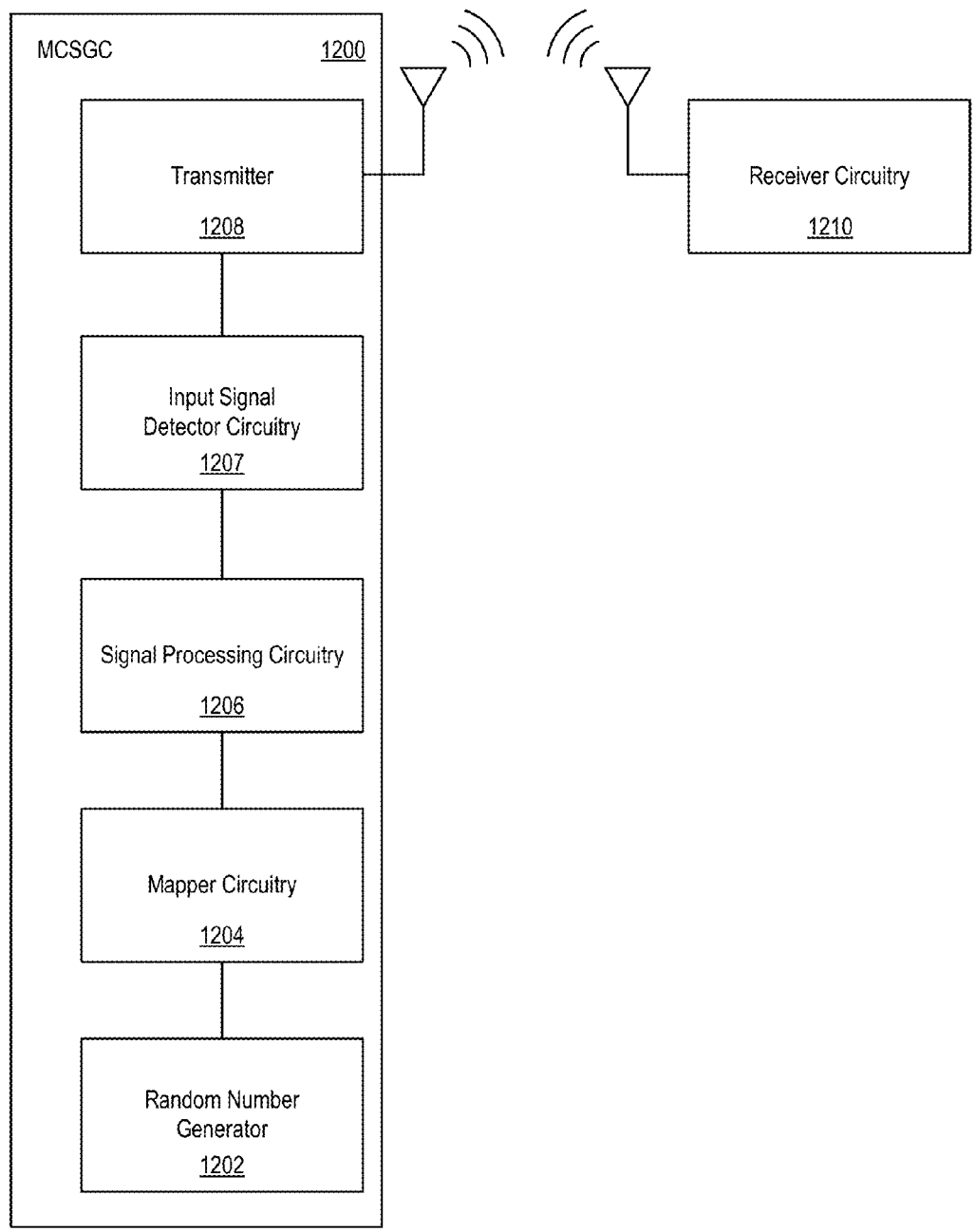
FIG. 12 shows example modulated data calibration signal generator circuitry.

FIG. 12 shows example modulated data calibration signal generator circuitry (MCSGC) 1200. The MCSGC 1200 may include a random number generator 1202, mapper circuitry 1204, signal processing circuitry 1206, input signal detector circuitry 1207, and transmitter 1208. The output of the MCSGC 1200 from transmitter 1208 may be received by receiver 1210. The random number generator may generate a random numerical value, e.g., a random sequence of bits, and provide the random numerical value to the mapper circuitry 1204. The mapper circuitry 1204 may map the random numerical value to a transmit variable value. For example, the mapper circuitry may receive the random numerical value and, in response, output a transmit signal with a corresponding amplitude value for systems in which amplitude is the varying transmit variable. Similarly, for system in which phase is the varying transmit variable, the mapper circuitry may map the random numerical value to a corresponding phase value.

In an example system, the mapper may have a set number our output values for the varying transmit variable. For example, the mapper may have a $2^n$ values for the set number of values each with an n-bit value assigned. The random number generator may generate a random n-bit sequence. Thus, the random number generator may be used to randomly select a transmit variable value from a possible set of $2^n$ values using a bit sequence with a length dependent on the number of possible values of the transmit variable.

Once the mapper circuitry 1204 assigns a value for the varying transmit variable, the value may be paired by the mapper circuitry 1204 with the constant value(s) for the other transmit variables. The mapper circuitry 1204 then sends transmit variable values the signal processing circuitry 1206 for signal processing such as filtering, upconversion, or other signal processing. The processed signal may be measured by the input signal detector circuitry 1207. The input signal detector circuitry 1207 may record and store the input signal sequence, e.g. $A_c e^{j\Phi(t)}$, or $A(t)e^{j\Phi}$, for use in later calibration calculations. The input signals are then sent to the transmitter 1208 for transmission. The time-varying transmit output of the MCSGC 1200 may be measured by the receiver circuitry 1210.

Before performing calibration calculations, the baseband circuitry may synchronize the time-varying input signal sequence with the measured time-varying transmit output sequence. In some cases, synchronization may be facilitated by transmitting a known sequence of signals before sending random data signals. The known sequence may then be time aligned with its corresponding transmit output.

In some implementations, once the modulated data is time synchronized with the measured output, the inputs and outputs may be sent to the PDCL 400 for analysis and calculation of the evaluation function. The PDCL 400 may select a number of time-synchronized input signal/transmit output pairs, for example, along a line of constant input phase, and generate an evaluation function.

In some cases, a large sample, for example, up to thousands or millions or more of sample points, of randomly-sequenced modulated data may be available. The PDCL 400 may use a small portion, for example, up to tens or hundreds or more, of the large number of modulated sample points. In some implementations, the PDCL 400 may use all the sample points in its calculation of the evaluation function. However, the processing power and memory consumed by the PDCL 400 may increase with the number of sample points used in the calculation of the evaluation function. Similarly, the processing power and memory consumed by the FIL 500 may increase with the number of sample points used in the calculation of the inverse evaluation function.

Additionally or alternatively, the PDCL 400 may implement a probability analysis, for example, via the modulated data calibration logic (MDCL) 1300 discussed below, or an averaging scheme, for example, via the calibration discussed below with respect to circles of constant amplitude. Techniques using probability analysis, averaging, or both may facilitate usage of a large sample, for example, up to thousands or millions or more, of input signal/transmit output pairs without necessarily implementing complex processing on the entirety of the large sample. Thus, techniques using probability analysis, averaging, or both may be robust to random or distributed noise and interference sources and random measurement inaccuracies because such effects may be averaged out over the large sample. Further, techniques using probability analysis, averaging, or both may consume amounts of processing power and memory that are similar to that of analysis for small sample sizes, for example, up to tens or hundreds of sample points.

For calibration over circles of constant amplitude, the PDCL 400 calculations of the terms of the truncated Fourier series are based on time averaged values of the transmit output multiplied by phase components of the time-varying signal input. The calculation does not necessarily depend ordering the transmit output in a particular phase progression. Thus, once the transmit output is time synchronized to the time-varying signal input, the PDCL 400 may perform calibration over circles of constant amplitude as discussed above.

For other calibration techniques, such as calibration over lines of constant phase, the system may correlate the frequency-spread time-varying input signals with the time-varying transmit output by performing a probability analysis on the recorded input signals and the recorded output signals. In some implementations, the probability analysis may include calculating the cumulative distribution function (CDF) for the time-varying input transmit variable and calculating CDFs for quantities dependent on the transmit output as functions of time-varying input transmit variable.

The following is a brief discussion of some properties of CDFs. A CDF of a random variable is the probability that the random variable is greater than x, e.g., the argument of the function. Hence, for a random variable X, the CDF, $H_X(x)$, of X is $H_X(x)=\text{prob}\{X \leq x\}$.

Another random variable, Y, may be defined as $g(X)$. A function of a random variable may also be a random variable. Y may also have a CDF, $H_Y(y)=\text{prob}\{Y \leq y\}$. If g is function that is monotonically increasing then for a value $y_0$ of Y and a value $x_0$ of X:

$$y_0 = g(x_0) \Leftrightarrow H_Y(y_0) = H_X(x_0)$$

This may be understood because for a monotonically increasing function g, the highest value of X may produce the highest value of Y, the second highest value of X may produce the second highest value of Y, and so on until the lowest value of X produces the lowest value of Y. Therefore, for a random set of values X, if $y_0 = g(x_0)$ then, the number of values in X that are above $x_0$ will be the same as the number of values in Y that are above $y_0$.

Similarly, if g is a monotonically decreasing function, then:

$$y_0 = g(x_0) \Leftrightarrow H_Y(y_0) = 1 - H_X(x_0)$$

This may be understood because for a monotonically decreasing function g, the highest value of X may produce the lowest value of Y, the second highest value of X may produce the second lowest value of Y, and so on until the lowest value of X produces the highest value of Y. Therefore, for a random set of values X, if $y_0 = g(x_0)$ then, the number of values in X that are above $x_0$ will be the same as the number of values in Y that are below $y_0$.

For a set of random values X, $H_X(x)$ may be calculated by counting the number of values in the set X that are below x and dividing by the total number of values in the set X. This may be repeated for all values of x between 0 and the highest value of X. All values of x above the highest value of X will produce a probability of 1, e.g., 100%.

Returning to the discussion of calibration, a random time-varying modulated-data transmit variable may be treated by the MDCL 1300, discussed below with respect to FIG. 13, as a random variable. For example, in phase-amplitude space, a random time-varying amplitude may be treated as a random variable.

For an input transmit variable X, the MDCL 1300 may define variables $Y_1 = g_1(X), Y_2 = g_2(X), \ldots, Y_n = g_n(X)$. The MDCL 1300 may correlate values $x_0, y_{1,0}, y_{2,0}, \ldots, y_{n,0}$ by determining the points where the CDFs of X, $Y_1, Y_2, \ldots, Y_n$ are equal. If one or more of the functions $g_n$ are monotonically decreasing, then for those functions the PDCL 400 correlate the values of X may where the CDF of X is equal to one minus the CDFs of, e.g., $Y_1, Y_2, \ldots, Y_n$.

Returning now to the example of a line of constant phase in a phase amplitude space, the MCSGC 1200 may record random time-varying input values of the amplitude, $A_{in}(t)$.

Figure 13:
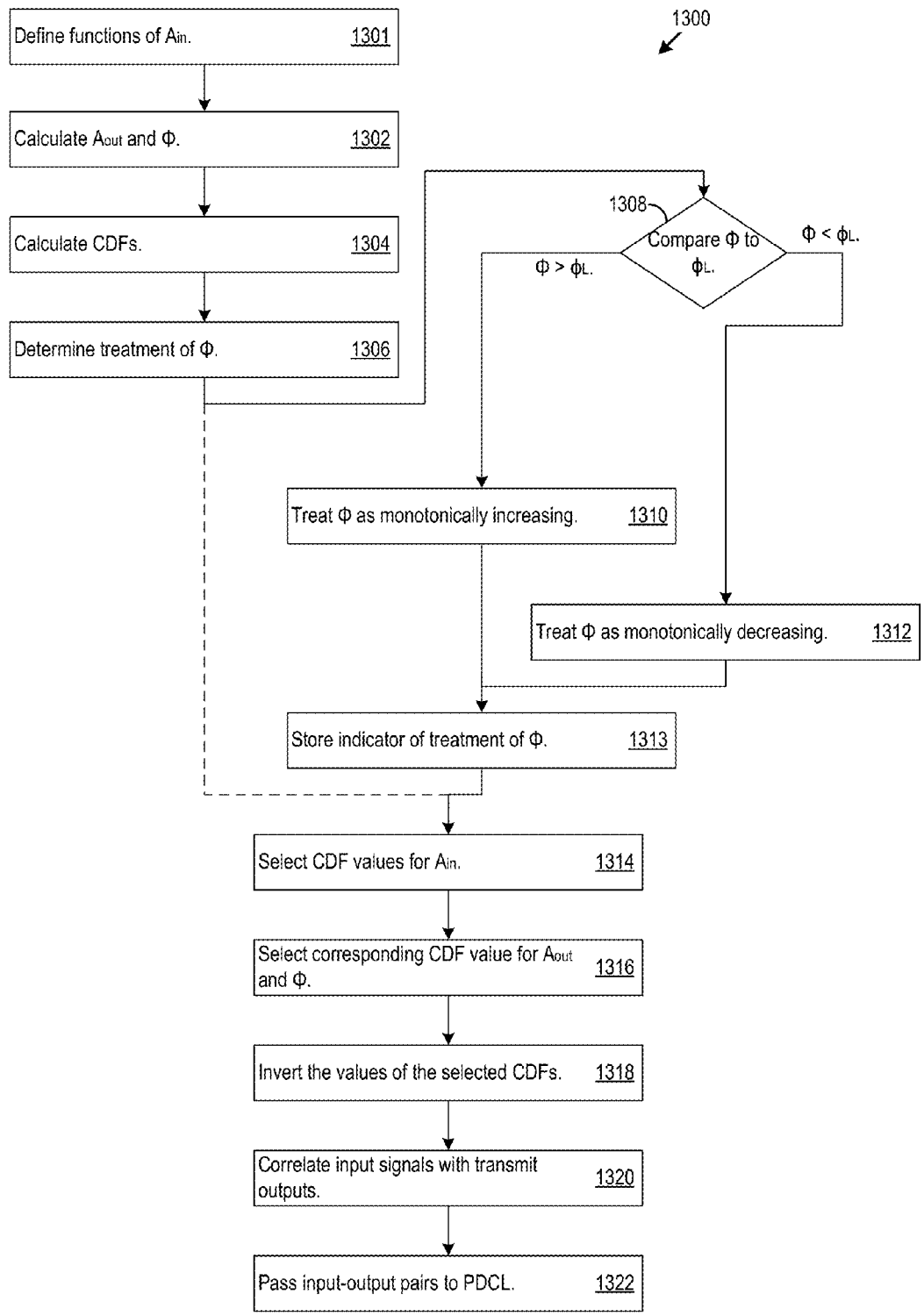
FIG. 13 shows example modulated data calibration logic.

FIG. 13 shows example MDCL 1300. The MDCL 1300 may operate in conjunction with the PDCL 400 and the MCSGC 1200. The MDCL 1300 may define functions of $A_{in}(t)$: a first function $A_{out}(A_{in}) = |F(A_{in}(t), \phi_L)|$, where $\phi_L$ is the constant value of phase; and a second function $\Phi_{out}(A_{in}) = \angle A_{in}(t) + \angle F(A_{in}(t), \phi_L)$ (1301). $A_{out}$ may be a monotonically increasing function of $A_{in}$. $\Phi_{out}$ may be a monotonically decreasing function of $A_{in}$ or a monotonically decreasing function of $A_{in}$. Once MCSGC 1200 records input values $A_{in}(t)$ and the receiver circuitry 1010 records output values $F(A_{in}(t), \phi_L)$, the MDCL 1300 may calculate $A_{out}(t)$ and $\Phi_{out}(t)$ (1302). In the example, $A_{in}(t)$ may be allowed to have positive or negative values. Then, the MDCL 1300 may calculate the CDFs of $A_{in}(t), A_{out}(t), \Phi_{out}(t)$ (1304).

The MDCL 1300 may determine whether to treat $\Phi_{out}(t)$ as a monotonically decreasing function of $A_{in}$ or a monotonically decreasing function of $A_{in}$ (1306). For example, the MDCL 1300 may access a stored memory setting indicating the treatment of $\Phi_{out}(t)$. Additionally or alternatively, the MDCL 1300 may determine whether values of $\Phi_{out}(t)$ are greater than or less than $\phi_L$ (1308) for values of $F(A_{in}(t), \phi_L)$ with positive amplitude. If values of $\Phi_{out}(t)$ are greater than $\phi_L$ for values of $F(A_{in}(t), \phi_L)$ with positive amplitude, the MDCL 1300 may treat $\Phi_{out}(t)$ as a monotonically increasing function of $A_{in}$ (1310). If values of $\Phi_{out}(t)$ are less than $\phi_L$ for values of F($A_{in}$(t), $\phi_L$) with positive amplitude, the MDCL 1300 may treat $\Phi_{out}$(t) as a monotonically decreasing function of $A_{in}$ (1312). The MDCL 1300 may store an indicator of the treatment of $\Phi_{out}$(t) for later calibrations (1313). In some cases, the treatment of $\Phi_{out}$(t) may be stored at factory setup as a default setting.

The MDCL 1300 may select one or more CDF values for $A_{in}$ (1314). Responsive to the CDF values for $A_{in}$, MDCL 1300 may select corresponding CDF values for $A_{out}$ and $\Phi_{out}$ (1316). The MDCL 1300 may invert the values of the selected CDF to determine the corresponding values sets of values, e.g., $A_{in,0}$, $A_{out,0}$, $\Phi_{out,0}$; $A_{in,1}$, $A_{out,1}$, $\Phi_{out,1}$, $A_{in,2}$, $A_{out,2}$, $\Phi_{out,2}$; . . . ; $A_{in,n}$, $A_{out,n}$, $\Phi_{out,n}$ (1318). Inverting the CDF allow the MDCL 1300 to specify a probability as an input and receive a value of the random variable corresponding to that probability as an output.

Using the sets of values, the MDCL 1300 may correlate input signals with transmit outputs (1320). For example, for the sets the MDCL 1300 may construct the relationship F($A_{in,n}$, $\phi_L$)=$A_{out,n}e^{j\Phi_{out,n}}$. Once, the input signals are correlated with the output signals the MDCL 1300, may pass the input-output pairs to the PDCL 400 for calculation of an evaluation function of the forward relationship (1322). The PDCL 400 may pass the evaluation function of the forward relationship to the FIL 500 for inversion and generation of an evaluation function of the reverse relationship.

Figure 14:
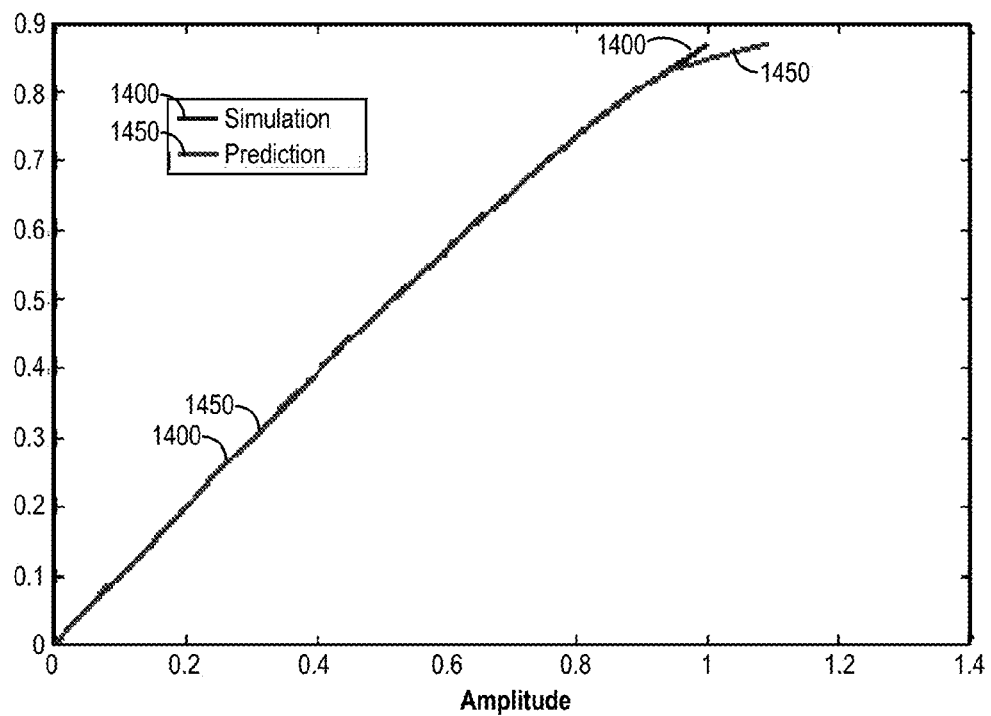
FIG. 14 shows an example plot of simulation versus prediction using lines of constant phase with modulated data.

FIG. 14 shows a plot of simulation 1400 versus prediction 1450 of $F_0$(A, $\phi$=$\pi$/10) using lines of constant phase with modulated data. The plot shows very good agreement between the simulated 1400 and predicted 1450 values.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
for baseband circuitry of a digital transmitter, establishing a multi-dimensional transmit signal parameter space defined by a first transmit variable and a second transmit variable;
within the multi-dimensional transmit signal parameter space, defining a selected number of calibration signals by holding constant the first transmit variable, and varying the second transmit variable for the selected number of calibration signals;
measuring transmit output of the digital transmitter responsive to the calibration signals as input;
responsive to the transmit output, determining a relationship from the transmit output of the digital transmitter to the calibration signals as input; and
with the baseband circuitry, distorting data for transmission by the digital transmitter according to the relationship and prior to transmitting the data by the digital transmitter.

2. The method of claim 1, further comprising causing transmission of selected modulated data signals from among the selected number of calibration signals.

3. The method of claim 2, further comprising measuring an average output for the transmit output of the modulated data signals to determine the relationship.

4. The method of claim 2, further comprising matching the modulated data signals to values of the transmit output by:
performing a probability analysis on the modulated data signals; and
performing the probability analysis on the values of the transmit output.

5. The method of claim 4, where the probability analysis comprises determining a cumulative distribution function.

6. The method of claim 2, where selecting the modulated data signals comprises:
assigning a numerical value from a set of numerical values to each of the selected number of calibration signals; and
randomly generating a first numerical value from the set of numerical values.

7. The method of claim 6, where:
randomly generating the first numerical value comprises randomly generating a set of bits comprising a length defined by a size of the set of numerical values; and assigning the numerical value to each of the selected number of calibration signals comprises assigning a series of bits to each of the selected number of calibration signals.

8. The method of claim 1, where:
the relationship comprises a truncated Fourier series relationship.

9. The method of claim 1, where:
at least one the first and second transmit variable comprises input phase; and
the method further comprises applying the relationship with a repeating period with respect to the input phase.

10. The method of claim 9, where the period with respect to the input phase comprises $\pi$ or $\pi/2$.

11. The method of claim 1, where:
the relationship comprises an evaluation function of the first and second transmit variables.

12. The method of claim 11, where the evaluation function of the first and second variables relates a desired transmitter output to a corresponding transmitter input.

13. The method of claim 12, further comprising evaluating the evaluation function to determine the corresponding transmitter input where an available representation of the relationship is table-free.

14. The method of claim 1, where:
the first transmit variable comprises a phase; and
the second transmit variable comprises an amplitude.

15. The method of claim 1, where:
the first transmit variable comprises an amplitude; and
the second transmit variable comprises a phase.

16. A device comprising:
receiver circuitry configured to:
    receive a transmit output, the transmit output responsive to first and second calibration signals as input; and
    measure the transmit output to generate transmit output data; and
baseband circuitry coupled the receiver circuitry, the baseband circuitry configured to:
    establish a transmit signal parameter space defined by a first transmit variable and a second transmit variable;
    within the transmit signal parameter space, define first calibration signals by holding constant the first transmit variable at a first value, and varying the second transmit variable for the first calibration signals;
    within the transmit signal parameter space, define the second calibration signals by holding constant the first transmit variable at a second value, and varying the second transmit variable for the second calibration signals;
    receive, from the receiver circuitry, the transmit output data;
    responsive to the transmit output data, determine a relationship from the transmit output to the first and second calibration signals as input; and
    store the relationship in the baseband circuitry to facilitate transmission pre-distortion.

17. The device of claim 16, where:
the device further comprises a digital transmitter; and
the baseband circuitry is further coupled to the digital transmitter, the baseband circuitry further configured to cause the digital transmitter to transmit a number of the first calibration signals before transmitting a number of the second calibration signals.

18. The device of claim 16, where the first calibration signals comprises modulated data signals with constant phase, constant amplitude, or both.

19. A product comprising:
a machine-readable medium other than a transitory signal;
instructions stored on the machine-readable medium, the instructions, when executed, configured to cause a baseband controller to:
    establish a multi-dimensional transmit signal parameter space defined by a first transmit variable and a second transmit variable;
    within the multi-dimensional transmit signal parameter space, define calibration signals by holding constant the first transmit variable, and varying the second transmit variable for the calibration signals;
    measure transmit output of a digital transmitter responsive to the calibration signals as input;
    responsive to the transmit output, determine a relationship from the transmit output of the digital transmitter to the calibration signals as input; and
    store the relationship in the baseband controller to facilitate transmission pre-distortion at the digital transmitter.

20. The product of claim 19, where the relationship comprises an evaluation function of the first and second transmit variables.

* * * * *